(12) United States Patent
Takei et al.

(10) Patent No.: US 8,304,489 B2
(45) Date of Patent: Nov. 6, 2012

(54) CURABLE SILICONE RESIN COMPOSITION

(75) Inventors: Yoshihito Takei, Kanagawa (JP); Kazunori Ishikawa, Kanagawa (JP); Takeaki Saiki, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/321,748

(22) PCT Filed: Jun. 8, 2010

(86) PCT No.: PCT/JP2010/059709
§ 371 (c)(1),
(2), (4) Date: Nov. 21, 2011

(87) PCT Pub. No.: WO2010/147030
PCT Pub. Date: Dec. 23, 2010

(65) Prior Publication Data
US 2012/0071604 A1    Mar. 22, 2012

(30) Foreign Application Priority Data

Jun. 19, 2009  (JP) .................. 2009-146563
Apr. 19, 2010  (JP) .................. 2010-096325

(51) Int. Cl.
*C09J 183/04*   (2006.01)
*C08G 77/04*    (2006.01)

(52) U.S. Cl. .................. 524/588; 528/14; 528/34

(58) Field of Classification Search .................. None
See application file for complete search history.

(56) References Cited

U.S. PATENT DOCUMENTS

| 4,528,081 | A | * | 7/1985 | Lien et al. ............ 522/39 |
| 4,585,669 | A | * | 4/1986 | Eckberg ............... 427/515 |
| 4,675,346 | A | * | 6/1987 | Lin et al. ............. 522/39 |
| 5,137,448 | A | * | 8/1992 | Dougherty et al. ..... 433/214 |
| 5,300,608 | A | * | 4/1994 | Chu et al. ............ 528/14 |
| 5,378,734 | A | * | 1/1995 | Inoue ................. 522/11 |
| 6,140,444 | A | * | 10/2000 | Levandoski et al. .... 528/14 |

(Continued)

FOREIGN PATENT DOCUMENTS

JP    06-051774 A    2/1994

(Continued)

OTHER PUBLICATIONS

International Search Report of corresponding International Application No. PCT/JP2010/059709, dated on Sep. 21, 2010.

*Primary Examiner* — Robert S Loewe

(74) *Attorney, Agent, or Firm* — Global IP Counselors, LLP

(57) ABSTRACT

A curable silicone resin composition has excellent closed-system curability, adhesiveness, heat-resistant coloration stability, and balance between transparency and adhesive strength. The curable silicone resin composition is a curable silicone resin composition comprising 100 parts by mass of a silicone A, the weight-average molecular weight of which is 20,000 to 200,000, and which has 2 or more (meth)acryloyl groups per molecule; 10 parts by mass or more of a silicone B, the weight-average molecular weight of which is 1,000 or greater but less than 20,000, and which has 2 or more (meth)acryloyl groups per molecule; 2 parts by mass or more of a silicone C, the weight-average molecular weight of which is 300 or more but less than 1,000, the (meth)acrylic equivalent of which is less than 450 g/mol, and which has 2 or more (meth)acryloyl groups per molecule; and a radical initiator.

20 Claims, 2 Drawing Sheets

U.S. PATENT DOCUMENTS

| | | | |
|---|---|---|---|
| 6,827,985 B2* | 12/2004 | Levandoski et al. | 427/515 |
| 6,828,355 B1* | 12/2004 | Chu | 522/99 |
| 7,105,584 B2* | 9/2006 | Chambers et al. | 522/99 |
| 7,452,937 B2* | 11/2008 | Cross et al. | 524/588 |
| 7,951,867 B2* | 5/2011 | Issari | 524/588 |
| 2002/0151616 A1* | 10/2002 | Ozai et al. | 522/99 |

FOREIGN PATENT DOCUMENTS

| | | |
|---|---|---|
| JP | 07-216232 A | 8/1995 |
| JP | 2000-169794 A | 6/2000 |
| JP | 2005-023291 A | 1/2005 |
| JP | 2008-205097 A | 9/2008 |
| JP | 2009-167295 A | 7/2009 |

* cited by examiner

CURABLE SILICONE RESIN COMPOSITION

CROSS-REFERENCE TO RELATED APPLICATIONS

This U.S. National stage application claims priority under 35 U.S.C. §119(a) to Japanese Patent Application No. 2009-146563, filed in Japan on Jun. 19, 2009, and to Japanese Patent Application No. 2010-096325, filed in Japan on Apr. 19, 2010, the entire contents of Japanese Patent Application No. 2009-146563 and Japanese Patent Application No. 2010-096325 are hereby incorporated herein by reference.

BACKGROUND

1. Field of the Invention

The present invention relates to a curable silicone resin composition.

2. Background Information

A curable silicone resin composition comprising a (meth)acrylic-modified organopolysiloxane, a silicone oil, and other components has been proposed in the past as described in Japanese Examined Patent Application Publication No. 6-51774.

SUMMARY

However, the present inventors have discovered that when curing by condensation of silanol groups and alkoxy groups is performed in a closed system, the alcohol formed as a byproduct of the condensation reaction is not released from the system, and the composition is prevented from curing.

The present inventors have also discovered that a composition comprising a (meth)acrylic-modified organopolysiloxane or the like has low adhesiveness to an adherend (e.g., glass), and that a composition comprising a (meth)acrylic-modified organopolysiloxane, and filler, and other components has excellent adhesive strength but inferior transparency.

Therefore, an object of the present invention is to provide a curable silicone resin composition having excellent closed-system curability, adhesiveness, heat-resistant coloration stability, and balance between transparency and adhesive strength.

As a result of concentrated investigation aimed at overcoming the abovementioned problems, the present inventors developed the present invention upon discovering that a composition comprising 100 parts by mass of a silicone A, the weight-average molecular weight of which is 20,000 to 200,000, and which has 2 or more (meth)acryloyl groups per molecule;

10 parts by mass or more of a silicone B, the weight-average molecular weight of which is 1,000 or greater but less than 20,000, and which has 2 or more (meth)acryloyl groups per molecule;

2 parts by mass or more of a silicone C, the weight-average molecular weight of which is 300 or more but less than 1,000, the (meth)acrylic equivalent of which is less than 450 g/mol, and which has 2 or more (meth)acryloyl groups per molecule; and a radical initiator, has excellent curability and no curing inhibition in a closed system, and excellent adhesiveness to glass and the like, heat-resistant coloration stability over time, and balance between transparency and adhesive strength (high shear strength and satisfactory fracture mode); i.e., the composition has excellent closed-system curability, adhesiveness, heat-resistant coloration stability, and balance between transparency and adhesive strength.

The present inventors also discovered that in an adhesive which is cured solely by radical generation as a curing system, oxygen inhibition causes the surface curability to be inadequate in portions (outward-protruding portions) where the adhesive is directly exposed to the air.

Regarding this problem, the present inventors have discovered that the surface curability is enhanced by adding a condensation catalyst to the composition described above.

Specifically, the present invention provides aspects 1 through 9 below.

1. A curable silicone resin composition comprising:

100 parts by mass of a silicone A, the weight-average molecular weight of which is 20,000 to 200,000, and which has 2 or more (meth)acryloyl groups per molecule;

10 parts by mass or more of a silicone B, the weight-average molecular weight of which is 1,000 or greater but less than 20,000, and which has 2 or more (meth)acryloyl groups per molecule;

2 parts by mass or more of a silicone C, the weight-average molecular weight of which is 300 or more but less than 1,000, the (meth)acrylic equivalent of which is less than 450 g/mol, and which has 2 or more (meth)acryloyl groups per molecule; and a radical initiator.

2. The curable silicone resin composition according to "1," wherein at least one species selected from the group comprising the silicone A, the silicone B, and the silicone C has one or more silyl groups which include a hydrolyzable group per molecule and/or silanol groups.

3. The curable silicone resin composition according to "1" or "2," wherein the silicone A is indicated by Formula (A1) below, and the silicone B is indicated by Formula (B1) below.

[Chemical Formula 1]

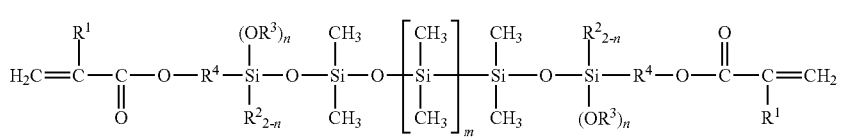

(A1)

(In the formula, $R^1$ are each a hydrogen atom or a methyl group; $R^2$ are each a $C_{1-6}$ hydrocarbon group; $R^3$ are each a hydrogen atom or a $C_{1-18}$ hydrocarbon group; $R^4$ are each a $C_{1-8}$ bivalent hydrocarbon group; n are each 1 or 2; and m is an integer from 270 to 2,700.)

[Chemical Formula 2]

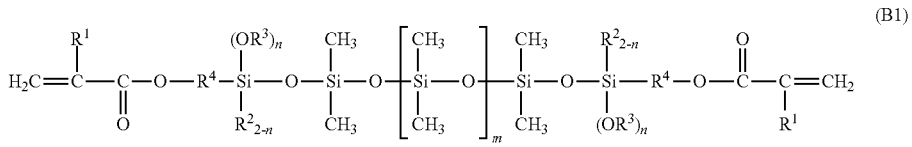

(In the formula, $R^1$ are each a hydrogen atom or a methyl group; $R^2$ are each a $C_{1-6}$ hydrocarbon group; $R^3$ are each a hydrogen atom or a $C_{1-18}$ hydrocarbon group; $R^4$ are each a $C_{1-8}$ bivalent hydrocarbon group; n are each 1 or 2; and m is an integer from 14 to 269.)

4. The curable silicone resin composition according to any of "1" through "3," wherein the silicone C is at least one species selected from the group comprising compounds indicated by Formula (3) below, Formula (4) below, and Formula (5) below.

[Chemical Formula 3]

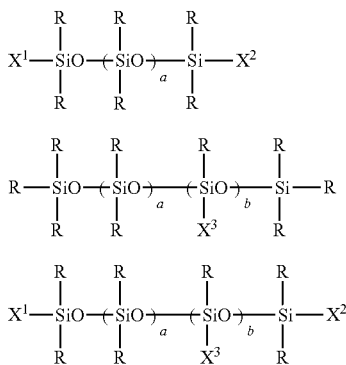

(In Formula (3), R are each an alkyl group; $X^1$ and $X^2$ are each a group indicated by Formula (6) below; and a is an integer from 0 to 13.

In Formula (4), R are each an alkyl group; $X^3$ is a group indicated by Formula (6) below; a is an integer from 0 to 13; b is 1 or an integer from 2 to 13; a+b is 1 or 2 to 13; and at least one R at one end may be designated as $X^3$, where $X^3$ is a group indicated by Formula (6) below.

In Formula (5), R are each an alkyl group; $X^1$, $X^2$, and $X^3$ are each a group indicated by Formula (6) below; a is an integer from 0 to 13; b is an integer from 1 to 13; and a+b is 1 to 13.)

[Chemical Formula 4]

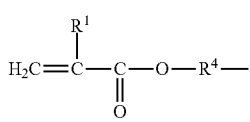

(In Formula (6), $R^1$ is a hydrogen group or a methyl group; and $R^4$ is a bivalent hydrocarbon group.)

5. The curable silicone resin composition according to any of "1" through "4," further comprising a condensation catalyst.

6. The curable silicone resin composition according to "5," wherein the amount of the condensation catalyst is 0.01 to 10 parts by mass with respect to a total of 100 parts by mass of the silicone A, the silicone B, and the silicone C.

7. The curable silicone resin composition according to any of "1" through "6," further comprising a bis(alkoxysilyl)alkane.

8. The curable silicone resin composition according to "7," wherein the bis(alkoxysilyl)alkane is at least one species selected from the group comprising bis-(3-trimethoxysilylpropyl)amine, 1,2-bis(triethoxysilyl)ethane, 1,6-bis(trimethoxysilyl)hexane, 1,7-bis(trimethoxysilyl)heptane, 1,8-bis(trimethoxysilyl)octane, 1,9-bis(trimethoxysilyl)nonane, and 1,10-bis(trimethoxysilyl)decane.

9. The curable silicone resin composition according to "7" or "8," wherein the amount of the bis(alkoxysilyl)alkane is 0.01 to 10 parts by mass with respect to 100 parts by mass of the silicone A.

The curable silicone resin composition of the present invention has excellent closed-system curability, adhesiveness, heat-resistant coloration stability, and balance between transparency and adhesive strength.

DETAILED DESCRIPTION OF EMBODIMENTS

Figure 1:
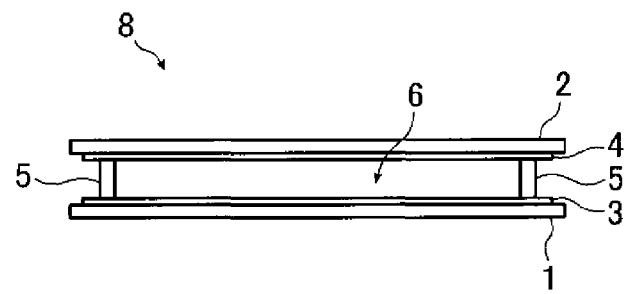
FIG. 1 is a schematic sectional view showing the mold used for curing the curable silicone resin composition of the present invention in an embodiment.

The present invention will be described in detail hereinafter.

The curable silicone resin composition of the present invention is a composition comprising
100 parts by mass of a silicone A, the weight-average molecular weight of which is 20,000 to 200,000, and which has 2 or more (meth)acryloyl groups per molecule;
10 parts by mass or more of a silicone B, the weight-average molecular weight of which is 1,000 or greater but less than 20,000, and which has 2 or more (meth)acryloyl groups per molecule;
2 parts by mass or more of a silicone C, the weight-average molecular weight of which is 300 or more but less than 1,000, the (meth)acrylic equivalent of which is less than 450 g/mol, and which has 2 or more (meth)acryloyl groups per molecule; and
a radical initiator.

The curable silicone resin composition of the present invention is referred to below as "the composition of the present invention."

The silicone A is described below.

The silicone A included in the composition of the present invention is a (meth)acrylic-modified polysiloxane in which the principal chain is a polysiloxane backbone, there are 2 or more (meth)acryloyl groups per molecule, and the weight-average molecular weight is 20,000 to 200,000.

The term "(meth)acrylic" in the present invention refers to one or both of acrylic and methacrylic.

The polysiloxane as the principal chain is not particularly limited. Examples thereof include organopolysiloxanes, and specific examples include dimethylpolysiloxanes and diethylpolysiloxanes. The polysiloxane of the principal chain may be straight-chained or branched.

In the present invention, there are 2 or more of the (meth)acryloyl groups of the silicone A per molecule thereof, and in the interest of producing more excellent closed-system curability, adhesiveness, heat-resistant coloration stability, and balance between transparency and adhesive strength, the number of (meth)acryloyl groups is preferably 2 to 6.

The silicone A may have a silyl group which includes a hydrolyzable group and/or silanol group, besides the (meth)acryloyl groups. In the interest of producing more excellent closed-system curability, adhesiveness, heat-resistant coloration stability, and balance between transparency and adhesive strength, as well as excellent heat- and moisture-resistant adhesiveness and excellent surface curability, the silicone A preferably has one or more silyl groups which include a hydrolyzable group per molecule and/or silanol groups. A silyl group including a hydrolyzable group may include one or more hydrolyzable groups per silyl group. In the silanol group, one or more hydroxy groups are preferably bonded to a single silicon atom.

The silyl group including a hydrolyzable group is not particularly limited. Examples thereof include alkoxysilyl groups.

In the interest of producing more excellent closed-system curability, adhesiveness, heat-resistant coloration stability, and balance between transparency and adhesive strength, as well as excellent heat- and moisture-resistant adhesiveness and excellent surface curability, the silicone A preferably also has an alkoxysilyl group.

Examples of alkoxysilyl groups include trialkoxysilyl groups, bivalent silyl groups having a dialkoxy group, and bivalent silyl groups having a monoalkoxy group and a monoalkyl group. Examples of the alkoxy group in the alkoxysilyl group include methoxy and ethoxy groups. Examples of alkyl groups of the alkoxysilyl group include methyl and ethyl groups.

Examples of silanol groups include trihydroxysilyl groups, bivalent silyl groups having a dihydroxy group, and bivalent silyl groups having a monohydroxy group and a monoalkyl group. Examples of alkyl groups include methyl and ethyl groups.

A (meth)acryloyl group may be bonded to a side chain and/or terminal end of the polysiloxane principal chain. (Meth)acryloyl groups may also be bonded to both terminal ends of the polysiloxane principal chain.

An alkoxysilyl group may be bonded to a side chain and/or terminal end of the polysiloxane principal chain. Alkoxysilyl groups may also be bonded to both terminal ends of the polysiloxane principal chain.

In the present invention, a (meth)acryloyl group may be bonded to an alkoxysilyl group via a bivalent hydrocarbon group. Examples of groups in which a (meth)acryloyl group is bonded to an alkoxysilyl group via a bivalent hydrocarbon group include groups indicated by Formula (1) below.

[Chemical Formula 5]

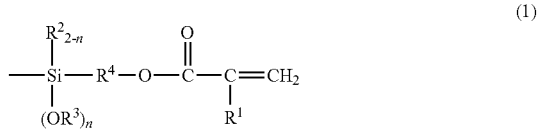

(1)

(In the formula, $R^1$ is a hydrogen atom or a methyl group; $R^2$ are each a $C_{1-6}$ hydrocarbon group; $R^3$ are each a hydrogen atom or a $C_{1-18}$ hydrocarbon group; $R^4$ are each a $C_{1-8}$ bivalent hydrocarbon group; and n is 1 or 2.)

In the interest of producing more excellent closed-system curability, adhesiveness, heat-resistant coloration stability, and balance between transparency and adhesive strength, a (meth)acryloyl group indicated by Formula (1) is preferred.

A group indicated by Formula (1) may be bonded to a side chain and/or terminal end of the organopolysiloxane, for example, which is the principal chain. A group indicated by Formula (1) may also be bonded to both terminal ends of the organopolysiloxane, for example, which is the principal chain.

In the group indicated by Formula (1), examples of $C_{1-6}$ hydrocarbon groups indicated by $R^2$ include alkyl groups such as methyl and ethyl groups; alicyclic hydrocarbon groups such as cyclohexyl groups; and aromatic hydrocarbon groups such as phenyl groups. Examples of $C_{1-18}$ hydrocarbon groups indicated by $R^3$ include alkyl groups such as methyl, ethyl, hexyl, octyl, decyl, and octadecyl groups; alicyclic hydrocarbon groups such as cyclohexyl groups; and aromatic hydrocarbon groups such as phenyl groups.

In Formula (1), the $C_{1-8}$ bivalent hydrocarbon group indicated by $R^4$ is not particularly limited. Examples thereof include methylene, ethylene, trimethylene, tetramethylene, and pentylene groups.

In the interest of producing more excellent closed-system curability, adhesiveness, heat-resistant coloration stability, and balance between transparency and adhesive strength, n is preferably 2.

Examples of the silicone A include compounds indicated by Formula (A1) below.

[Chemical Formula 6]

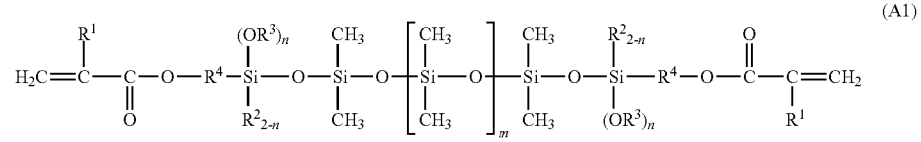

(A1)

(In the formula, $R^1$ are each a hydrogen atom or a methyl group; $R^2$ are each a $C_{1-6}$ hydrocarbon group; $R^3$ are each a hydrogen atom or a $C_{1-18}$ hydrocarbon group; $R^4$ are each a $C_{1-8}$ bivalent hydrocarbon group; n are each 1 or 2; and m is an integer from 270 to 2,700.)

$R^1$ through $R^4$, and n are the same as in Formula (1).

In the interest of producing more excellent closed-system curability, adhesiveness, heat-resistant coloration stability, and balance between transparency and adhesive strength, as well as excellent workability, m is preferably an integer from 270 to 1,350.

In the interest of producing more excellent closed-system curability, adhesiveness, heat-resistant coloration stability, and balance between transparency and adhesive strength, as well as excellent heat- and moisture-resistant adhesiveness, the silicone A is preferably one indicated by Formula (A1).

In the present invention, the weight-average molecular weight of the silicone A is 20,000 to 200,000.

In the interest of producing more excellent closed-system curability, adhesiveness, heat-resistant coloration stability, and balance between transparency and adhesive strength, as well as excellent workability, the weight-average molecular weight of the silicone A is preferably 20,000 to 100,000.

In the present invention, the weight-average molecular weight of the silicone A is indicated in terms of polystyrene as determined by gel permeation chromatography (GPC) using chloroform as the solvent.

Each silicone A may be used singly or in combinations of two or more types thereof.

The manufacture of the silicone A is not particularly limited. For example, the silicone A may be manufactured by condensation dealcoholization of an organopolysiloxane having a hydroxy group at both terminal ends thereof (e.g., an organopolysiloxane indicted by Formula (IV)) and a compound or condensate of a compound indicated by Formula (V).

[Chemical Formula 7]

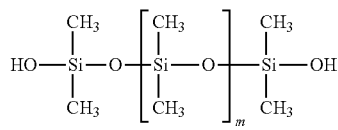

(IV)

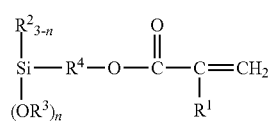

(V)

(In Formula (V), $R^1$ are each a hydrogen atom or a methyl group; $R^2$ are each a $C_{1-6}$ hydrocarbon group; $R^3$ are each a hydrogen atom or a $C_{1-18}$ hydrocarbon group; $R^4$ are each a $C_{1-8}$ bivalent hydrocarbon group; and n is 2 or 3. In Formula (IV), m is an integer from 270 to 2,700.)

$R^1$ through $R^4$ are the same as in Formula (1), and m has the same definition as in Formula (A1).

In the interest of producing more excellent closed-system curability, adhesiveness, heat-resistant coloration stability, and balance between transparency and adhesive strength, as well as excellent suppression of heating loss, the compound indicated by Formula (V) is preferably reacted in an amount exceeding 2 moles per mole of the organopolysiloxane having a hydroxy group at both terminal ends thereof.

The silicone B is described below.

The silicone B included in the composition of the present invention is a (meth)acrylic-modified polysiloxane in which the principal chain is a polysiloxane backbone there are 2 or more (meth)acryloyl groups per molecule, and the weight-average molecular weight is 1,000 or greater but less than 20,000.

The silicone B may function as a compatibilizer and an adhesiveness-imparting agent for the silicone A and the silicone C, and may impart flexibility to the resultant cured material. Consequently, by including the silicone B, the curable silicone resin composition of the present invention has excellent closed-system curability, adhesiveness, heat-resistant coloration stability, and balance between transparency and adhesive strength, as well as excellent compatibility.

The polysiloxane as the principal chain is not particularly limited. Examples thereof are the same as those for the silicone A. The polysiloxane of the principal chain may be straight-chained or branched.

In the present invention, there are 2 or more of the (meth) acryloyl groups of the silicone B per molecule thereof, and in the interest of producing more excellent closed-system curability, adhesiveness, heat-resistant coloration stability, and balance between transparency and adhesive strength, as well as excellent heat- and moisture-resistant adhesiveness, the number of (meth)acryloyl groups is preferably 2 to 6.

The silicone B may have a silyl group which includes a hydrolyzable group and/or silanol group, besides the (meth) acryloyl groups. In the interest of producing more excellent closed-system curability, adhesiveness, heat-resistant coloration stability, and balance between transparency and adhesive strength, as well as excellent heat- and moisture-resistant adhesiveness and excellent surface curability, the silicone B preferably has one or more silyl groups which include a hydrolyzable group per molecule and/or silanol groups. The silyl group which includes a hydrolyzable group or silanol group is not particularly limited. An alkoxysilyl group is cited as an example of a silyl group that includes a hydrolyzable group.

In the interest of producing more excellent closed-system curability, adhesiveness, heat-resistant coloration stability, and balance between transparency and adhesive strength, as well as excellent heat- and moisture-resistant adhesiveness and excellent surface curability, the silicone B preferably also has an alkoxysilyl group. Examples of alkoxysilyl groups are the same as those for the silicone A. Examples of the alkoxy group in an alkoxysilyl group are the same as those for the silicone A.

A (meth)acryloyl group may be bonded to a side chain and/or terminal end of the polysiloxane principal chain. (Meth)acryloyl groups may also be bonded to both terminal ends of the polysiloxane principal chain.

An alkoxysilyl group may be bonded to a side chain and/or terminal end of the polysiloxane principal chain. Alkoxysilyl groups may also be bonded to both terminal ends of the polysiloxane principal chain.

In the present invention, a (meth)acryloyl group may be bonded to an alkoxysilyl group via a bivalent hydrocarbon group. Examples of groups in which a (meth)acryloyl group is bonded to an alkoxysilyl group via a bivalent hydrocarbon group include groups indicated by Formula (1) below.

[Chemical Formula 8]

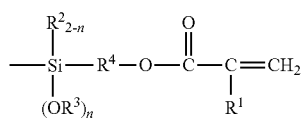

(1)

(In the formula, $R^1$ is a hydrogen atom or a methyl group; $R^2$ are each a $C_{1-6}$ hydrocarbon group; $R^3$ are each a hydrogen atom or a $C_{1-18}$ hydrocarbon group; $R^4$ are each a $C_{1-8}$ bivalent hydrocarbon group; and n is 1 or 2.)

In the interest of producing more excellent closed-system curability, adhesiveness, heat-resistant coloration stability, and balance between transparency and adhesive strength, a (meth)acryloyl group indicated by Formula (1) is preferred. The group indicated by Formula (1) in which a (meth)acryloyl group is bonded to an alkoxysilyl group via a bivalent hydrocarbon group in the silicone B is the same as that of Formula (1) in silicone A.

A group indicated by Formula (1) may be bonded to a side chain and/or terminal end of the organopolysiloxane, for example, which is the principal chain. A group indicated by formula (1) may also be bonded to both terminal ends of the organopolysiloxane, for example, which is the principal chain.

Examples of the silicone B include compounds indicated by Formula (B1) below.

[Chemical Formula 9]

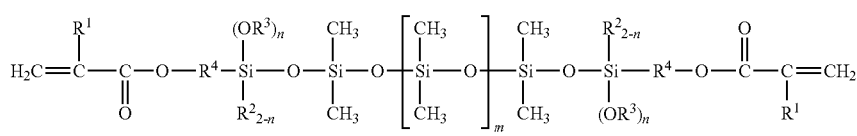

(B1)

(In the formula, $R^1$ are each a hydrogen atom or a methyl group; $R^2$ are each a $C_{1-6}$ hydrocarbon group; $R^3$ are each a hydrogen atom or a $C_{1-18}$ hydrocarbon group; $R^4$ are each a $C_{1-8}$ bivalent hydrocarbon group; n are each 1 or 2; and m is an integer from 14 to 269.)

$R^1$ through $R^4$, and n are the same as in Formula (1).

In the interest of producing more excellent closed-system curability, adhesiveness, heat-resistant coloration stability, and balance between transparency and adhesive strength, as well as excellent workability, m is preferably an integer from 80 to 250.

In the interest of producing more excellent closed-system curability, adhesiveness, heat-resistant coloration stability, and balance between transparency and adhesive strength, as well as excellent heat- and moisture-resistant adhesiveness, the silicone B is preferably one indicated by Formula (B1).

In the present invention, the weight-average molecular weight of the silicone B is 1,000 or greater but less than 20,000.

In the interest of producing more excellent closed-system curability, adhesiveness, heat-resistant coloration stability, and balance between transparency and adhesive strength, as well as excellent compatibility and heat- and moisture-resistant adhesiveness, the weight-average molecular weight of the silicone B is preferably 6,000 or greater but less than 20,000.

In the present invention, the weight-average molecular weight of the silicone B is indicated in terms of polystyrene as determined by gel permeation chromatography (GPC) using chloroform as the solvent.

Each silicone B may be used singly or in combinations of two or more types thereof.

The manufacture of the silicone B is not particularly limited. For example, the silicone B may be manufactured by condensation dealcoholization of an organopolysiloxane having a hydroxy group at both terminal ends thereof (e.g., an organopolysiloxane indicated by Formula (IV)) and a compound or condensate of a compound indicated by Formula (V).

[Chemical Formula 10]

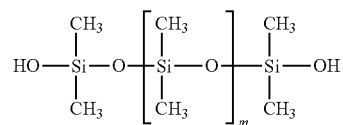

(IV)

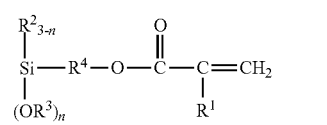

(V)

(In Formula (V), $R^1$ are each a hydrogen atom or a methyl group; $R^2$ are each a $C_{1-6}$ hydrocarbon group; $R^3$ are each a hydrogen atom or a $C_{1-18}$ hydrocarbon group: $R^4$ are each a $C_{1-8}$ bivalent hydrocarbon group; and n is 2 or 3. In Formula (IV), m is an integer from 14 to 269.)

$R^1$ through $R^4$ are the same as in Formula (I), and m has the same definition as in Formula (B1).

In the interest of producing more excellent closed-system curability, adhesiveness, heat-resistant coloration stability, and balance between transparency and adhesive strength, as well as excellent suppression of heating loss, the compound indicated by Formula (V) is preferably reacted in an amount exceeding 2 moles per mole of the organopolysiloxane having a hydroxy group at both terminal ends thereof.

In the present invention, the amount of the silicone B is 10 parts by mass or more with respect to 100 parts by mass of the silicone A.

In the interest of producing more excellent closed-system curability, adhesiveness, heat-resistant coloration stability, and balance between transparency and adhesive strength, as well as excellent compatibility, the amount of the silicone B with respect to 100 parts by mass of the silicone A is preferably 10 to 200 parts by mass, and more preferably 100 to 200 parts by mass.

The silicone C is described below.

The silicone C included in the composition of the present invention is a (meth)acrylic-modified polysiloxane in which the principal chain is a polysiloxane backbone, there are 2 or more (meth)acryloyl groups per molecule, the (meth)acrylic equivalent is less than 450 g/mol, and the weight-average molecular weight is 300 or greater but less than 1,000.

By including the silicone C, the composition of the present invention has excellent closed-system curability, adhesiveness, heat-resistant coloration stability, and balance between transparency and adhesive strength, and the strength of the resultant cured material can be increased.

The polysiloxane as the principal chain is not particularly limited. Examples thereof include organopolysiloxanes, and specific examples include dimethylpolysiloxanes and diethylpolysiloxanes. The polysiloxane of the principal chain may be straight-chained or branched.

In the present invention, there are 2 or more of the (meth)acryloyl groups of the silicone C per molecule thereof, and in the interest of producing more excellent closed-system curability, adhesiveness, heat-resistant coloration stability, and balance between transparency and adhesive strength, the number of (meth)acryloyl groups is preferably 2 to 6.

Examples of (meth)acryloyl groups include those indicated by Formula (6) below.

[Chemical Formula 11]

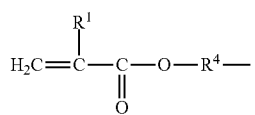
(6)

(In the formula, $R^1$ is a hydrogen group or a methyl group; and $R^4$ is a bivalent hydrocarbon group.)

The number of carbon atoms in the bivalent hydrocarbon group of $R^4$ is preferably 1 to 8. The $C_{1-8}$ bivalent hydrocarbon group is the same as in Formula (1).

In the interest of producing more excellent closed-system curability, adhesiveness, heat-resistant coloration stability, and balance between transparency and adhesive strength, the (meth)acryloyl group is preferably one indicated by Formula (6).

A (meth)acryloyl group may be bonded to a side chain and/or terminal end of the polysiloxane principal chain. (Meth)acryloyl groups may also be bonded to both terminal ends of the polysiloxane principal chain.

The silicone C may have a silyl group which includes a hydrolyzable group and/or silanol group. The silyl group which includes a hydrolyzable group or silanol group may be the same as described above.

Examples of the silicone C include compounds indicated by Formula (3), Formula (4), and Formula (5) below.

[Chemical Formula 12]

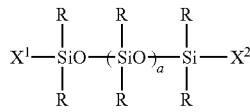
(3)

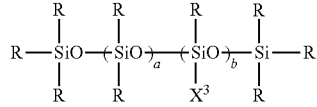
(4)

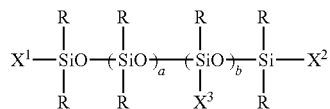
(5)

(In Formula (3), R are each an alkyl group; $X^1$ and $X^2$ are each a group indicated by Formula (6) above; and a is an integer from 0 to 13.

In Formula (4), R are each an alkyl group; $X^3$ is a group indicated by Formula (6) above; a is an integer from 0 to 13; b is an integer from 1 (or 2) to 13 (i.e., 1, or 2 or greater and 13 or less); and a+b is 1 (or 2) to 13 (i.e., 1, or 2 or greater and 13 or less). In Formula (4), at least one R at one terminal end may be designated as $X^3$, where $X^3$ is a group indicated by Formula (6) above. In the case that at least one R at one terminal end is designated as $X^3$, b may be 1 or greater (the same below).

In Formula (5), R are each an alkyl group; $X^1$, $X^2$, and $X^3$ are each a group indicated by Formula (6) above; a is an integer from 0 to 13; b is an integer from 1 to 13; and a+b is 1 to 13.)

The alkyl group as R in Formulas (3) through (5) is not particularly limited. Examples thereof may be the same as $R^2$ ($C_{1-6}$ hydrocarbon group) in Formula (1).

In the interest of producing more excellent closed-system curability, adhesiveness, heat-resistant coloration stability, and balance between transparency and adhesive strength, a in Formula (3) is preferably an integer from 0 to 5.

In the interest of producing more excellent closed-system curability, adhesiveness, heat-resistant coloration stability, and balance between transparency and adhesive strength, a in Formula (4) is preferably an integer from 0 to 5, b is preferably an integer from 1 (or 2) to 5 (i.e., 1, or 2 or greater and 5 or less), and a+b is preferably 1 (or 2) to 10 (i.e., (i.e., 1, or 2 or greater and 10 or less). In Formula (4), at least one R at one terminal end may be designated as $X^3$, where $X^3$ is a group indicated by Formula (6) above.

In the interest of producing more excellent closed-system curability, adhesiveness, heat-resistant coloration stability, and balance between transparency and adhesive strength, a in Formula (5) is preferably an integer from 0 to 5, b is preferably an integer from 1 to 5, and a+b is preferably 1 to 10.

In the interest of producing more excellent closed-system curability, adhesiveness, heat-resistant coloration stability, and balance between transparency and adhesive strength, the silicone C is preferably at least one species selected from the group comprising compounds indicated by Formula (3), Formula (4), and Formula (5).

In the present invention, the weight-average molecular weight of the silicone C is 300 or greater but less than 1,000.

In the interest of producing more excellent closed-system curability, adhesiveness, heat-resistant coloration stability, and balance between transparency and adhesive strength, the weight-average molecular weight of the silicone C is preferably 300 to 500.

In the present invention, the weight-average molecular weight of the silicone C is indicated in terms of polystyrene as determined by gel permeation chromatography (GPC) using chloroform as the solvent.

In the present invention, the (meth)acrylic equivalent of the silicone C is less than 450 g/mol.

In the interest of producing more excellent closed-system curability, adhesiveness, heat-resistant coloration stability, and balance between transparency and adhesive strength, the (meth)acrylic equivalent of the silicone C is preferably 100 to 200 g/mol.

Each silicone C may be used singly or in combinations of two or more types thereof.

The manufacture of the silicone C is not particularly limited, and the silicone C may be manufactured by a conventional known method, for example.

In the present invention, the amount of the silicone C is 2 parts by mass or greater with respect to 100 parts by mass of the silicone A.

In the interest of producing more excellent closed-system curability, adhesiveness, heat-resistant coloration stability, and balance between transparency and adhesive strength, the amount of the silicone C with respect to 100 parts by mass of the silicone A is preferably 2 to 100 parts by mass, more preferably 5 to 50 parts by mass, and more preferably 20 to 50 parts by mass.

Besides the silicones A through C, the composition of the present invention may include a compound in which $X^2$ in Formula (3) is an R: alkyl group. Here, R, $X^1$, and a are the same as described above.

The radical initiator is described below.

The radical initiator included in the composition of the present invention is not particularly limited insofar as the radical initiator induces radical polymerization of (meth) acryloyl groups by heat and/or light.

In the interest of producing more excellent closed-system curability, adhesiveness, heat-resistant coloration stability, and balance between transparency and adhesive strength, the radical initiator preferably does not include a nitrogen atom or a sulfur atom, and a radical initiator composed of carbon atoms, hydrogen atoms, and oxygen atoms is more preferred.

Examples of radical initiators which use heat (thermal radical initiators) include aliphatic hydrocarbon peroxides such as 1,1,3,3-tetramethylbutylperoxy-2-ethylhexanoate, lauryl peroxide, t-butylperoxide, and t-amylperoxybutane; aromatic peroxides such as benzoyl peroxide and cumene hydroperoxide; and azo compounds such as azobisisobutyronitrile.

Examples of radical initiators which use light (photo-radical initiators) include carbonyl compounds such as acetophenone-based compounds, benzoin ether-based compounds, and benzophenone-based compounds; and sulfur compounds, azo compounds, peroxide compounds, phosphine oxide-based compounds, and the like.

Specific examples include carbonyl compounds such as benzoin, benzoin methyl ether, benzoin ethyl ether, benzoin isopropyl ether, acetoin, butryoin, toluoin, benzyl, benzophenone, p-methoxybenzophenone, diethoxyacetophenone, α,α-dimethoxy-α-phenylacetophenone, methyl phenyl glyoxylate, ethyl phenyl glyoxylate, 4,4'-bis(dimethylaminobenzophenone), 2-hydroxy-2-methyl-1-phenylpropene-1-one, and 1-hydroxy-cyclohexyl-phenylketone; sulfur compounds such as tetramethylthiuram monosulfide and tetramethylthiuram disulfide; azo compounds such as azobis isobutyronitrile and azobis-2,4-dimethylvalero; and peroxide compounds such as benzoyl peroxide and di-tert-butyl peroxide.

In the interest of producing more excellent closed-system curability, adhesiveness, heat-resistant coloration stability, and balance between transparency and adhesive strength, the amount of the radical initiator is preferably 0.1 to 5 parts by mass with respect to 100 parts by mass of the silicone A.

The composition of the present invention may further comprise a condensation catalyst. In the case that the composition of the present invention further comprises a condensation catalyst, the composition can be endowed with more excellent closed-system curability, adhesiveness, heat-resistant coloration stability, and balance between transparency and adhesive strength, and in the case that the composition is used as an adhesive, the composition can be endowed with excellent surface curability of outward-protruding portions and portions directly exposed to the air, and adhesiveness and shearing adhesive strength are substantially unaffected. In the composition of the present invention, in the case that at least one species selected from the group comprising the silicone A, the silicone B, and the silicone C has one or more silyl groups which include a hydrolyzable group per molecule and/or silanol groups, the further inclusion of a condensation catalyst is useful for providing excellent surface curability. Among the silicones, the silicone A and/or the silicone B preferably have one or more silyl groups which include a hydrolyzable group per molecule and/or silanol groups.

The condensation catalyst which the composition of the present invention may further comprise is not particularly limited insofar as the condensation catalyst is capable of inducing hydrolysis and condensation of a silyl group that comprises a hydrolyzable group or silanol group. Examples of the condensation catalyst include boron compounds or organic metal compounds that include metals such as tin, aluminum, titanium, zirconium, hafnium, calcium, and barium. Among these examples, an organic tin compound is preferred in the interest of producing excellent surface curability. Examples of organic metal compounds include metal alkoxide compounds, metal chelate compounds, and metal alkyl compounds.

The organic tin compound is not particularly limited insofar as the compound has a tin atom and an organic group. Examples thereof include tin compounds indicated by Formulas (I) through (V) below (specifically, mixtures of dioctyltin compounds (e.g., dioctyltin salts) and orthosilicate compounds (e.g., ethyl orthosilicate), for example, or reactants (e.g., products having the trade names U-780 and S-1, both manufactured by Nitto Kasei Co., Ltd.)).

[Chemical Formula 13]

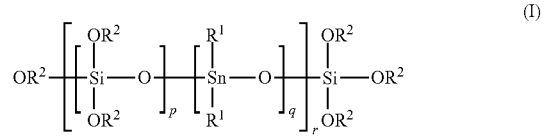

(I)

In Formula (I), $R^1$ are $C_{1-10}$ hydrocarbon groups; $R^2$ are $C_{1-4}$ hydrocarbon groups; p is an integer from 1 to 10; q is an integer from 1 to 4; and r is an integer from 1 to 5.

[Chemical Formula 14]

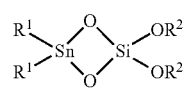

(II)

[Chemical Formula 15]

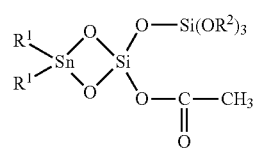

(III)

-continued

[Formula 16]

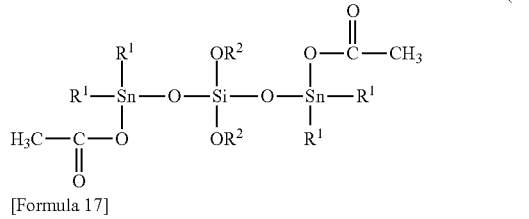
(IV)

[Formula 17]

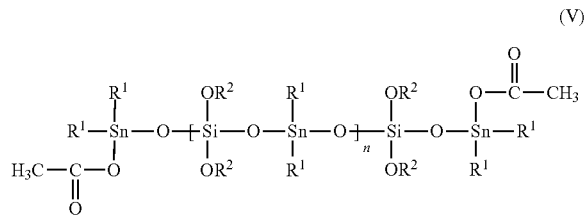
(V)

In Formulas (II) through (V), $R^1$ are $C_{1-10}$ hydrocarbon groups (e.g., aliphatic hydrocarbon groups, alicyclic hydrocarbon groups, and aromatic hydrocarbon groups such as octyl groups); and $R^2$ are $C_{1-4}$ hydrocarbon groups (e.g., aliphatic hydrocarbon groups such as ethyl groups). In Formula (V), n is an integer equal to 1 or greater.

The manufacture of the condensation catalyst is not particularly limited. Condensation catalysts may be used singly or in combinations of two or more types thereof.

In the interest of producing more excellent closed-system curability, adhesiveness, heat-resistant coloration stability, and balance between transparency and adhesive strength, as well as excellent surface curability, the amount of the condensation catalyst with respect to a total of 100 parts by mass of the silicone A, the silicone B, and the silicone C is preferably 0.01 to 10 parts by mass, and more preferably 0.01 to 1 part by mass.

The composition of the present invention may further comprise a bis(alkoxysilyl)alkane. In the case that the composition of the present invention comprises a bis(alkoxysilyl)alkane, the bis(alkoxysilyl)alkane may function as an adhesiveness-imparting agent. In the interest of producing more excellent closed-system curability, adhesiveness, heat-resistant coloration stability, and balance between transparency and adhesive strength, the composition of the present invention preferably further comprises a bis(alkoxysilyl)alkane as an adhesiveness-imparting agent.

The bis(alkoxysilyl)alkane that can be included in the composition of the present invention is a bivalent alkane having two alkoxysilyl groups per molecule thereof.

The alkoxy group in the alkoxysilyl group is not particularly limited. Examples thereof include methoxy groups and ethoxy groups.

A single alkoxysilyl group may have 1 to 3 alkoxy groups. Examples of groups other than alkoxy groups that can bond with an alkoxysilyl group include alkyl groups such as methyl and ethyl groups.

The bivalent alkane (alkylene group) is not particularly limited. A bivalent alkane may have a hetero atom such as an oxygen atom, a nitrogen atom, or a sulfur atom, for example. The number of carbon atoms in the bivalent alkane is not particularly limited. In the interest of producing more excellent closed-system curability, adhesiveness, heat-resistant coloration stability, and balance between transparency and adhesive strength, as well as excellent heat- and moisture-resistant adhesiveness and excellent compatibility, the number of carbon atoms in the bivalen alkane is preferably 2 to 10.

Examples of bis(alkoxysilyl)alkanes include compounds indicated by Formula (VII) below.

[Chemical Formula 18]

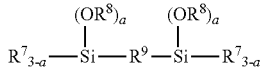
(VII)

In the formula, $R^7$ through $R^8$ are each an alkyl group; $R^9$ is a bivalent alkane; and a are each an integer from 1 to 3. Examples of alkyl groups include methyl and ethyl, groups. The bivalent alkane of $R^9$ is the same as the bivalent alkane described above.

Examples of bis(alkoxysilyl)alkanes include 1,2-bis(triethoxysilyl)ethane, 1,4-bis(trimethoxysilyl)butane, 1-methyldimethoxysilyl-4-trimethoxysilyl butane, 1,4-bis(methyldimethoxysilyl)butane, 1,5-bis(trimethoxysilyl)pentane, 1,4-bis(trimethoxysilyl)pentane, 1-methyldimethoxysilyl-5-trimethoxysilyl pentane, 1,5-bis(methyldimethoxysilyl)pentane, 1,6-bis(trimethoxysilyl)hexane, 1,4-bis(trimethoxysilyl)hexane, 1,5-bis(trimethoxysilyl)hexane, 2,5-bis(trimethoxysilyl)hexane, 1,6-bis(methyldimethoxysilyl)hexane, 1,7-bis(trimethoxysilyl)heptane, 2,5-bis(trimethoxysilyl)heptane, 2,6-bis(trimethoxysilyl)heptane, 1,8-bis(trimethoxysilyl)octane, 2,5-bis(trimethoxysilyl)octane, 2,7-bis(trimethoxysilyl)octane, 1,9-bis(trimethoxysilyl)nonane, 2,7-bis(trimethoxysilyl)nonane, 1,10-bis(trimethoxysilyl)decane, and 3,8-bis(trimethoxysilyl)decane; and nitrogen-containing compounds such as bis-(3-trimethoxysilylpropyl)amine.

In the interest of producing more excellent closed-system curability, adhesiveness, heat-resistant coloration stability, and balance between transparency and adhesive strength, as well as excellent heat- and moisture-resistant adhesiveness, the bis(alkoxysilyl)alkane is preferably one indicated by Formula (VII); a bis(trialkoxysilyl)alkane is more preferred; at least one species selected from the group comprising bis-(3-trimethoxysilylpropyl)amine, 1,2-bis(triethoxysilyl)ethane, 1,6-bis(trimethoxysilyl)hexane, 1,7-bis(trimethoxysilyl)heptane, 1,8-bis(trimethoxysilyl)octane, 1,9-bis(trimethoxysilyl)nonane, and 1,10-bis(trimethoxysilyl) is more preferred; and 1,6-bis(trimethoxysilyl)hexane and bis-(3-trimethoxysilylpropyl)amine are particularly preferred.

The bis(alkoxysilyl)alkanes may be used singly or in combinations of two or more types thereof.

In the interest of producing more excellent closed-system curability, adhesiveness, heat-resistant coloration stability, and balance between transparency and adhesive strength, as well as excellent heat- and moisture-resistant adhesiveness, the amount of the bis(alkoxysilyl)alkane with respect to 100 parts by mass of the silicone A is preferably 0.01 to 10 parts by mass, and more preferably 0.1 to 3 parts by mass.

In the interest of producing more excellent closed-system curability, adhesiveness, heat-resistant coloration stability, and balance between transparency and adhesive strength, as well as excellent heat- and moisture-resistant adhesiveness, the composition of the present invention may be a composition composed of the silicone A, the silicone B, the silicone C, and a radical initiator (i.e., the composition comprises only the four above components).

In the interest of producing more excellent closed-system curability, adhesiveness, heat-resistant coloration stability, and balance between transparency and adhesive strength, as well as excellent heat- and moisture-resistant adhesiveness, the composition of the present invention may be a composition composed of the silicone A, the silicone B, the silicone C, a radical initiator, and a bis(alkoxysilyl)alkane (i.e., the composition comprises only the five above components).

In the interest of producing more excellent closed-system curability, adhesiveness, heat-resistant coloration stability, and balance between transparency and adhesive strength, as well as excellent heat- and moisture resistant adhesiveness and excellent surface curability, the composition of the present invention may be a composition composed of the silicone A, the silicone B, the silicone C, a radical initiator, and a condensation catalyst (i.e., the composition comprises only the five above components).

In the interest of producing more excellent closed-system curability, adhesiveness, heat-resistant coloration stability, and balance between transparency and adhesive strength, as well as excellent heat- and moisture resistant adhesiveness and excellent surface curability, the composition of the present invention may be a composition composed of the silicone A, the silicone B, the silicone C, a radical initiator, a condensation catalyst, and a bis(alkoxysilyl)alkane (i.e., the composition comprises only the six above components).

Besides the silicone A, the silicone B, the silicone C, a radical initiator, a bis(alkoxysilyl)alkane, and a condensation catalyst, the composition of the present invention may comprise further additives as needed in a range which does not compromise the objects and effects of the present invention.

Examples of additives include inorganic fillers, antioxidants, lubricants, UV absorbers, thermal and photo-stabilizers, dispersants, antistatic agents, polymerization inhibitors, antifoaming agents, curing accelerators, solvents, inorganic phosphors, anti-aging agents, radical inhibitors, adhesion improvers, flame retardants, surfactants, storage stability improvers, ozone anti-aging agents, thickeners, plasticizers, radiation blockers, nucleating agents, coupling agents, conductivity-imparting agents, phosphorus-based peroxide decomposers, pigments, metal deactivators, and physical property-adjusting agents. The various additives are not particularly limited, and conventional known additives may be used.

In a preferred embodiment of the present invention, the composition preferably includes essentially no water, in the interest of producing excellent storage stability. For the composition to include essentially no water in the present invention means that the amount of water in the composition of the present invention is 0.1% by mass or less.

In a preferred embodiment of the present invention, the composition preferably includes essentially no solvents, in the interest of producing excellent work environment properties. For the composition to include essentially no solvents in the present invention means that the amount of solvents in the composition of the present invention is 1% by mass or less.

The manufacture of the composition of the present invention is not particularly limited. For example, the composition can be manufactured by mixing the silicone A, the silicone B, the silicone C, a radical initiator, and the bis(alkoxysilyl) alkane, condensation catalyst, and additives that can be used as needed.

The composition of the present invention can be manufactured as a one-component or two-component product.

The composition of the present invention can be used as an adhesive, a primer, or a sealant (e.g., for optical semiconductors), for example.

Examples of adherends to which the composition of the present invention can be applied include glass, plastic, and rubber.

Optical semiconductors to which the composition of the present invention can be applied are not particularly limited. Examples thereof include light-emitting diodes (LEDs, e.g., white LEDs), organic electroluminescent elements (organic EL), laser diodes, and LED arrays.

As an example of a method for using the composition of the present invention, the composition of the present invention is applied to an adherend (e.g., glass, plastic, rubber, an optical semiconductor, or the like), the adherend to which the composition of the present invention is applied is heated, and/or light is radiated to the adherend to which the composition of the present invention is applied, and the composition of the present invention is cured.

For example, a glass laminate can be obtained by applying the composition of the present invention between a plurality of glass units and curing the composition to bond the plurality of glass units via the composition of the present invention.

An optical semiconductor can also be sealed by placing an optical semiconductor between a plurality of glass units, and applying the composition of the present invention between the glass units and curing the composition to bond the plurality of glass units via the composition of the present invention.

The method for applying the composition of the present invention to an adherend is not particularly limited. Examples thereof include methods using a dispenser, potting methods, screen printing, transfer molding, and injection molding.

In the interest of producing more excellent closed-system curability, adhesiveness, heat-resistant coloration stability, and balance between transparency and adhesive strength, as well as having the ability to set the curing time and working life to a suitable length, better suppress foaming of alcohol byproducts of the condensation reaction, and suppress cracking of the cured material, and of producing excellent smoothness, moldability, and physical properties of the cured material, the temperature during heating of the composition of the present invention is preferably near 80° C. to 150° C. for curing, and more preferably near 150° C.

In the case that the composition of the present invention is cured by photoirradiation, ultraviolet rays and electron beams, for example, may be used.

In the interest of producing excellent curability and transparency, curing may be performed under essentially moisture-free conditions. In the present invention, for curing to be performed under essentially moisture-free conditions means that the atmospheric humidity of the environment in which heating and/or photoirradiation takes place is 10% RH or lower.

The transmittance of the cured material obtained through use of the composition of the present invention (in the case that the thickness of the cured material is 2 mm), measured at a wavelength of 400 nm by using an ultraviolet/visible absorption spectrometer (manufactured by Shimadzu Corporation, the same below) in accordance with JIS K0115:2004, is preferably 80% or greater, and more preferably 85% or greater.

The transmittance of the cured material obtained through use of the composition of the present invention, measured at a wavelength of 400 nm by using an ultraviolet/visible spectrometer in accordance with JIS K0115:2004 for the cured material after heat resistance testing (allowing the cured material (thickness: 2 mm) subsequent to initial curing to stand for 500 hours in conditions of 100° C.) subsequent to initial curing, is preferably 80% or greater, and more preferably 85% or greater.

The transparency retention (obtained by multiplying the transmittance after heat resistance testing, or the transmittance during initial curing by 100) of the cured material obtained through use of the composition of the present invention is preferably 70 to 100%, and more preferably 80 to 100%.

The composition of the present invention can be used not only for optical semiconductors, but for applications involving display materials, optical recording medium materials, optical instrument materials, optical component materials, optical fiber materials, optical/electronic functional organic materials, materials surrounding semiconductor integrated circuits, and other applications.

EXAMPLES

The present invention will be specifically described through examples. However, the present invention is not limited by these examples.

1. Manufacture of Modified organopolysiloxane (1) Modified organopolysiloxane 1

One hundred parts by mass of a polydimethylsiloxane (weight-average molecular weight: 28,000; trade name ss70, manufactured by Shin-Etsu Chemical Co., Ltd.) having a silanol group at both ends thereof, 4 parts by mass of methacryloxypropyltrimethoxysilane (trade name KBM503, manufactured by Shin-Etsu Chemical Co., Ltd.), and 0.01 part by mass of tin 2-ethylhexanoate (manufactured by Kanto Kagaku) were placed in a reactor vessel and reacted for 6 hours while the pressure was maintained at 10 mmHg and the temperature was maintained at 80° C.

The reaction product was subjected to $^1$H-NMR analysis, and both terminal ends of the polydimethylsiloxane were confirmed to be methacryloxypropyldimethoxysilyl groups.

The polydimethylsiloxane thus obtained was designated as Modified organopolysiloxane 1.

The weight-average molecular weight of Modified organopolysiloxane 1 was 35,000 in terms of polystyrene as determined by gel permeation chromatography (GPC) using chloroform as the solvent (the same below).

(2) Modified organopolysiloxane 2

A polydimethylsiloxane having a methacryloxypropyldimethoxysilyl group at both ends thereof was manufactured in the same manner as Modified organopolysiloxane 1, except that the polydimethylsiloxane starting material was substituted with 100 parts by mass of a polydimethylsiloxane (weight-average molecular weight: 6,000; trade name PRX-413, manufactured by Dow Corning Toray) having a silanol group at both ends thereof.

The reaction product was subjected to $^1$H-NMR analysis, and both terminal ends of the polydimethylsiloxane were confirmed to be methacryloxypropyldimethoxysilyl, groups.

The polydimethylsiloxane thus obtained was designated as Modified organopolysiloxane 2.

The weight-average molecular weight of Modified organopolysiloxane 2 was 15,000.

(3) Modified organopolysiloxane 3

A polydimethylsiloxane having a methacryloxypropyldimethoxysilyl group at both ends thereof was manufactured in the same manner as Modified organopolysiloxane 1, except that the polydimethylsiloxane starting material was substituted with a polydimethylsiloxane (weight-average molecular weight: 60,000; trade name x-21-5848, manufactured by Shin-Etsu Chemical Co., Ltd.) having a silanol group at both ends thereof.

The reaction product was subjected to $^1$H-NMR analysis, and both terminal ends of the polydimethylsiloxane were confirmed to be methacryloxypropyldimethoxysilyl groups.

The polydimethylsiloxane thus obtained was designated as Modified organopolysiloxane 3.

The weight-average molecular weight of Modified organopolysiloxane 3 was 63,000 in terms of polystyrene as determined by gel permeation chromatography (GPC) using chloroform as the solvent (the same below).

(4) Modified organopolysiloxane 4

A polydimethylsiloxane having a methacryloxypropyldimethoxysilyl group at both ends thereof was manufactured in the same manner as Modified organopolysiloxane 1, except that the polydimethylsiloxane (ss70) having a hydroxy group at both ends was substituted with a polydimethylsiloxane (weight-average molecular weight: 3,000; trade name KF-9701, manufactured by Shin-Etsu Chemical Co., Ltd.) having a hydroxy group at both ends thereof.

The reaction product was subjected to $^1$H-NMR analysis, and both terminal ends of the polydimethylsiloxane were confirmed to be methacryloxypropyldimethoxysilyl groups.

The polydimethylsiloxane thus obtained was designated as Modified organopolysiloxane 4.

The weight-average molecular weight of Modified organopolysiloxane 4 was 6,000 in terms of polystyrene as determined by gel permeation chromatography (GPC) using chloroform as the solvent (the same below).

2. Manufacture of Curable Silicone Resin Composition

A curable silicone resin composition was manufactured by uniformly mixing the components shown in Table 1 below in the amounts (parts by mass) shown in a stirring machine equipped with a vacuum pump.

TABLE 1

| | Example | | | | | | |
|---|---|---|---|---|---|---|---|
| | 1 | 2 | 3 | 4 | 5 | 6 | 7 |
| Silicone A-1 | 100 | 100 | 100 | 100 | 100 | 100 | |
| Silicone B-1 | 30 | 20 | 100 | 100 | 30 | 150 | 20 |
| Silicone C-1 | 10 | 6 | 25 | 50 | 10 | 50 | 6 |
| Silicone A-2 | | | | | | | 100 |
| Silicone B-2 | | | | | | | |
| Silicone C-2 | | | | | | | |
| (D) Radical initiator 1 | 1 | 1 | 1 | 1 | | | |
| (D) Radical initiator 2 | | | | | 2 | 2 | 2 |
| Condensation catalyst 1 | | | | | | | |
| Condensation catalyst 2 | | | | | | | |
| Condensation catalyst 3 | | | | | | | |

TABLE 1-continued

|  |  | | | | | | | |
|---|---|---|---|---|---|---|---|---|
| (E) Bis(alkoxysilyl)alkane | | | | 0.1 | 0.1 | | | |
| (F) Dimethylpolysiloxane | | | | | | | | |
| (G) Alkoxy oligomer | | | | | | | | |
| (H) Zirconyl naphthenoate | | | | | | | | |
| (I) Epoxy silicone | | | | | | | | |
| (J) Cationic polymerization catalyst | | | | | | | | |
| (K) Filler | | | | | | | | |
| Closed-system initial curing state | | ○ | ○ | ○ | ○ | ○ | ○ | ○ |
| Transmittance (%) | Initial | 89 | 90 | 90 | 90 | 90 | 90 | 90 |
|  | After heat-resistance testing | 87 | 89 | 88 | 89 | 89 | 90 | 90 |
| Transmittance retention (%) | | 98 | 99 | 99 | 99 | 99 | 100 | 100 |
| Heat-resistant coloration stability | | No yellowing | No yellowing | No yellowing | No yellowing | No yellowing | No yellowing | No yellowing |
| Shearing adhesive strength (MPa)/Fracture mode | | 1.5/CF | 1.6/CF | 2.5/CF | 2.9/CF | 2.7/CF | 1.6/CF | 1.5/CF |
| Shearing adhesive strength evaluation | | ○ | ○ | ○ | ○ | ○ | ○ | ○ |

|  | Example | | | | | |
|---|---|---|---|---|---|---|
|  | 8 | 9 | 10 | 11 | 12 | 13 |
| Silicone A-1 | 100 | 100 | 100 | 100 | 100 | 100 |
| Silicone B-1 | | 30 | 20 | 150 | 20 | 30 |
| Silicone C-1 | 6 | 10 | 6 | 50 | 4 | 10 |
| Silicone A-2 | | | | | | |
| Silicone B-2 | 20 | | | | | |
| Silicone C-2 | | | | | | |
| (D) Radical initiator 1 | | 1 | 1 | 1 | | |
| (D) Radical initiator 2 | | | | | 3 | 3 |
| Condensation catalyst 1 | | 0.2 | | | 0.15 | |
| Condensation catalyst 2 | | | 0.2 | | | 0.0 |
| Condensation catalyst 3 | | | | 0.1 | | |
| (E) Bis(alkoxysilyl)alkane | | 1 | 1 | I | 0.5 | 1 |
| (F) Dimethylpolysiloxane | | | | | | |
| (G) Alkoxy oligomer | | | | | | |
| (H) Zirconyl naphthenoate | | | | | | |
| (I) Epoxy silicone | | | | | | |
| (J) Cationic polymerization catalyst | | | | | | |
| (K) Filler | | | | | | |
| Closed-system initial curing state | ○ | ○ | ○ | ○ | ○ | ○ |
| Transmittance (%) Initial | 90 | 90 | 90 | 90 | 90 | 90 |
| After heat-resistance testing | 90 | 89 | 89 | 89 | 89 | 88 |
| Transmittance retention (%) | 100 | 99 | 99 | 99 | 99 | 98 |
| Heat-resistant coloration stability | No yellowing | No yellowing | No yellowing | No yellowing | No yellowing | No yellowing |
| Shearing adhesive strength (MPa)/Fracture mode | 1.6/CF | 2.9/CF | 1.9/CF | 2.5/CF | 1.5/CF | 2.3/CF |
| Shearing adhesive strength evaluation | ○ | ○ | ○ | ○ | ○ | ○ |

|  | Comparative Example | | | | | | |
|---|---|---|---|---|---|---|---|
|  | 1 | 2 | 3 | 4 | 5 | 6 | 7 |
| Silicone A-1 | | 100 | | | 100 | | 100 |
| Silicone B-1 | | | 100 | | 100 | 100 | |
| Silicone C-1 | | | | 100 | | 30 | 10 |
| Silicone A-2 | | | | | | | |
| Silicone B-2 | | | | | | | |
| Silicone C-2 | | | | | | | |
| (D) Radical initiator 1 | | 1 | 1 | 1 | 1 | 1 | 1 |
| (D) Radical initiator 2 | | | | | | | |
| Condensation catalyst 1 | | | | | | | |
| Condensation catalyst 2 | | | | | | | |
| Condensation catalyst 3 | | | | | | | |
| (E) Bis(alkoxysilyl)alkane | | | | | | | |

TABLE 1-continued

| | | | | | | | |
|---|---|---|---|---|---|---|---|
| (F) Dimethylpolysiloxane | 100 | | | | | | |
| (G) Alkoxy oligomer | 5 | | | | | | |
| (H) Zirconyl naphthenoate | 0.05 | | | | | | |
| (I) Epoxy silicone | | | | | | | |
| (J) Cationic polymerization catalyst | | | | | | | |
| (K) Filler | | | | | | | |
| Closed-system initial curing state | No-cured | ○ | ○ | ○ | ○ | ○ | ○ |
| Transmittance (%) Initial | — | 90 | 90 | 90 | 90 | 89 | 90 |
| Transmittance (%) After heat-resistance testing | — | 88 | 88 | 87 | 89 | 89 | 88 |
| Transmittance retention (%) | — | 98 | 98 | 97 | 99 | 100 | 98 |
| Heat-resistant coloration stability | — | No yellowing | No yellowing | No yellowing | No yellowing | No yellowing | No yellowing |
| Shearing adhesive strength (MPa)/Fracture mode | — | 1.0/CF | 0.8/AF | 0.6/AF | 0.9/AF | 2.0/AF | 0.8/AF |
| Shearing adhesive strength evaluation | — | x | x | x | x | x | x |

| | Comparative Example | | | | | |
|---|---|---|---|---|---|---|
| | 8 | 9 | 10 | 11 | 12 | 13 |
| Silicone A-1 | | 100 | 100 | 100 | 100 | 100 |
| Silicone B-1 | | | 20 | 20 | 5 | |
| Silicone C-1 | | | | 1 | 2 | 20 |
| Silicone A-2 | | | | | | |
| Silicone B-2 | | | | | | |
| Silicone C-2 | | | 10 | | | |
| (D) Radical initiator 1 | | 1 | | | | |
| (D) Radical initiator 2 | | | 2 | 2 | 2 | 2 |
| Condensation catalyst 1 | | | | | | |
| Condensation catalyst 2 | | | | | | |
| Condensation catalyst 3 | | | | | | |
| (E) Bis(alkoxysilyl)alkane | | | | | | |
| (F) Dimethylpolysiloxane | | | | | | |
| (G) Alkoxy oligomer | | | | | | |
| (H) Zirconyl naphthenoate | | | | | | |
| (I) Epoxy silicone | 100 | | | | | |
| (J) Cationic polymerization catalyst | 0.1 | | | | | |
| (K) Filler | | 3 | | | | |
| Closed-system initial curing state | ○ | Cloudy | ○ | ○ | ○ | Cloudy |
| Transmittance (%) Initial | 91 | 65 | 90 | 90 | 90 | — |
| Transmittance (%) After heat-resistance testing | 58 | 64 | 89 | 89 | 89 | — |
| Transmittance retention (%) | 74 | 100 | 99 | 99 | 99 | — |
| Heat-resistant coloration stability | Yellowing | No yellowing | No yellowing | No yellowing | No yellowing | — |
| Shearing adhesive strength (MPa)/Fracture mode | — | — | 0.7/AF | 0.8/AF | 0.3/AF | — |
| Shearing adhesive strength evaluation | — | — | x | x | x | — |

The components shown in Table 1 are described below.
Silicone A-1: Modified organopolysiloxane 1 manufactured as described above.
Silicone B-1: Modified organopolysiloxane 2 manufactured as described above.
Silicone C-1: Trade name x-22-164; manufactured by Shin-Etsu Chemical Co., Ltd; methacrylic-modified dimethylpolysiloxane having no alkoxysilyl group in the molecule; Mw=380; acrylic equivalent: 190 g/mol.
Silicone A-2: Modified organopolysiloxane 3 manufactured as described above.
Silicone B-2: Modified organopolysiloxane 4 manufactured as described above.
Silicone F-1: Trade name x-22-164AS (manufactured by Shin-Etsu Chemical Co., Ltd.); molecular weight=900; acrylic equivalent: 450 g/mol; structural formula shown below.

[Chemical Formula 19]

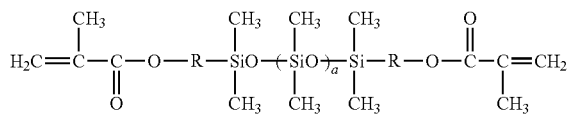

In the formula, a=10.
(D) Radical initiator 1: thermal radical initiator; compound name: 1,1,3,3-tetramethylbutylperoxy-2-ethylhexanoate; trade name: Perocta O (manufactured by Nof Corporation).
(D) Radical initiator 2: photo-radical initiator; eutectic mixture of IRGACURE 184 (1-hydroxy-cyclohexyl-phenyl-ketone) and benzophenone; trade name: IRGACURE 500 (Ciba).
Condensation catalyst 1: catalyst mixture of a dioctyltin compound and an orthosilicate compound (trade name: U-780, manufactured by Nitto Kasei Co., Ltd.)
Condensation catalyst 2: catalyst mixture of a dioctyltin compound and an orthosilicate compound (trade name: S-1, manufactured by Nitto Kasei Co., Ltd.)
Condensation catalyst 3: compound name: monobutyltin tris(2-ethylhexanoate) (trade name: SCAT-24, manufactured by Nitto Kasei Co., Ltd.)
(E) Bis(alkoxysilyl)alkane: bis-(3-trimethoxysilylpropyl) amine indicated by the formula below (trade name: KBM666P, manufactured by Shin-Etsu Chemical Co., Ltd.)

[Chemical Formula 20]

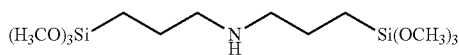

(F) Dimethylpolysiloxane: compound indicated by the formula below (trade name: ss-10, manufactured by Shin-Etsu Chemical Co., Ltd., Mw=42,000)

[Chemical Formula 21]

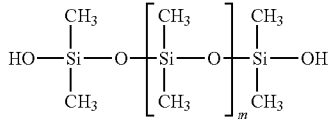

(G) Alkoxy oligomer: trade name x-40-9246, manufactured by Shin-Etsu Chemical Co., Ltd. (Mw=6,000).

(H) Zirconyl naphthenate, manufactured by Nihon Kagaku Sangyo Co., Ltd.
(I) Epoxy silicone: epoxy-modified polysiloxane (trade name: KF101, manufactured by Shin-Etsu Chemical Co., Ltd.)
(J) Cationic polymerization catalyst: $BF_3 \cdot Et_2O$ ($BF_3$ ethyl etherate complex, manufactured by Tokyo Chemical Industry Co., Ltd.)
(K) Filler: fumed silica, trade name Aerosil 300, manufactured by Japan Aerosil 3. Evaluation The closed-system initial curing state, transmittance, transmittance retention, heat-resistant coloration stability, shearing adhesive strength and fracture mode, and shearing adhesive strength were evaluated by the methods described below for the curable silicone resin compositions obtained as described above. The results of evaluation are shown in Table 1.

<Sample Fabrication>

The fabrication of a sample is described below with reference to the attached drawings.

FIG. 1 is a schematic sectional view showing the mold used for curing the curable silicone resin composition of the present invention in an embodiment.

In FIG. 1, the mold 8 has a glass 1 (length: 5 cm, width: 5 cm; thickness: 4 mm), a mold release paper 3 (a polyethylene terephthalate (PET) film was used as the mold release paper; the same below) on the glass 1, a silicone spacer 5 (having a square outline; height: 2 mm) on the mold release paper 3, a mold release paper 4 on the spacer 5, and a glass 2 on the mold release paper 4. The inside 6 of the mold 8 is filled with the composition 6. The composition 6 becomes the cured material 6 after curing. The mold 8 is fixed in a jig (not shown).

FIG. 2 is a schematic top view showing a partial separation of the mold 8 used for curing the curable silicone resin composition of the present invention in an embodiment.

Figure 2A:
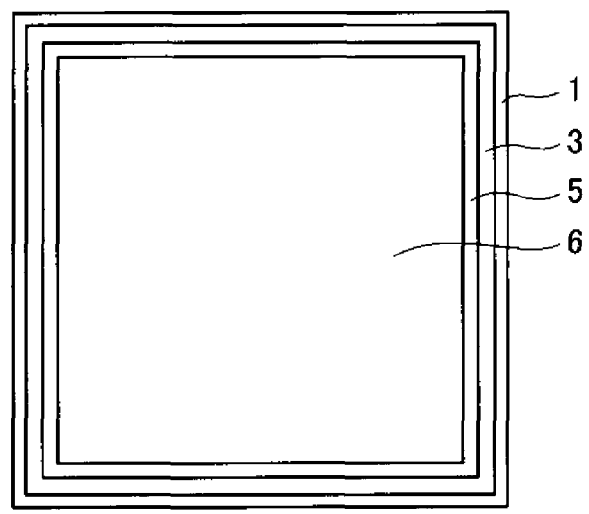
FIG. 2 is a schematic top view showing a partial separation of the mold 8 used for curing the curable silicone resin composition of the present invention in an embodiment.
Figure 2B:
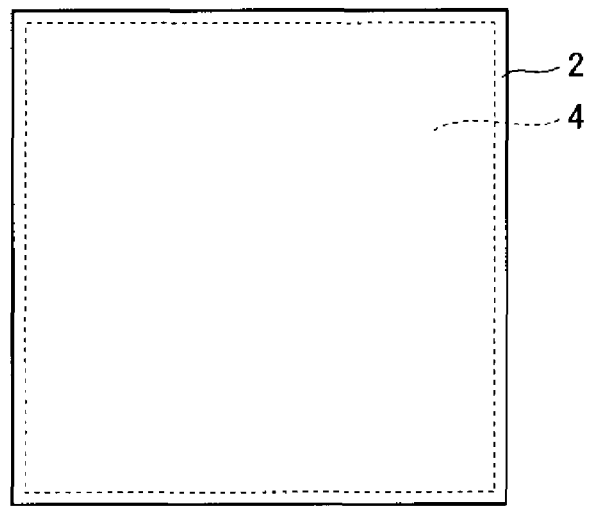

The mold 8 is obtained by first stacking the glass 1, the mold release paper 3, and the silicone spacer 5 as shown in FIG. 2A, pouring the composition into the inside 6, and then stacking the mold release paper 4 and the glass 2 shown in FIG. 2B on the silicone spacer 5 shown in FIG. 2A.

<Curing Conditions>

(1) Composition Comprises a Thermal Radical Initiator

The cured material is obtained by placing the mold 8 in an electric oven and heating for 3 hours at 150° C.

(2) Composition Comprises a Photo-Radical Initiator

The mold 8 was irradiated with ultraviolet rays having a wavelength of 250 to 380 nm for 40 seconds at a light quantity of 120 mW/cm through use of a photoirradiation device (trade name: GS UVSYSTEM TYPE S250-01, manufactured by GS Yuasa Lighting; irradiated at an integrated light quantity of 1,800 mJ/cm² using a metal hydro lamp as the light source), and the cured material was obtained at an integrated light quantity of 1,800 mJ/cm².

(3) Composition Comprises a Cationic Polymerization Catalyst

The cured material was obtained by placing the mold 8 in an electric oven and heating for 1 hour at 80° C., then heating for 1 hour at 150°.

<Evaluation Conditions>

(1) Closed-System Initial Curing State

The mold 8 was used to cure the composition under the conditions described above, and the initial curing state was evaluated.

In the evaluation criteria, cases were designated as "×" when the surface was gelled or not cured, and "○" when tack was no longer present.

(2) Transmittance, Transmittance Retention

In the transmittance evaluation, the transmittance at a wavelength of 400 nm was measured by using an ultraviolet/visible absorption spectrometer (manufactured by Shimadzu Corporation) in accordance with JIS K0115:2004 for each of the initial cured material obtained by using the mold 8 to cure the composition under the conditions described above, and the cured material after heat resistance testing (further heating the initial cured material for 500 hours at 100° C.). The retention of transmittance with respect to the initial transmittance after heat resistance testing was calculated by the equation shown below.

Transmittance retention (%)=(Transmittance after heat resistance testing)/(Initial transmittance)×100

(3) Heat-Resistant Coloration Stability

A determination was made by visual observation as to whether the cured material after heat resistance testing had yellowed in comparison with the initial cured material, for the initial cured material obtained by using the mold 8 to cure the composition under the conditions described above, and the cured material after heat resistance testing (heating the initial cured material for 500 hours at 100° C.).

(4) Shearing Adhesive Strength and Fracture Mode

The shear testing piece used to evaluate the shearing adhesive strength and the fracture mode is described below with reference to the attached drawings.

Figure 3:
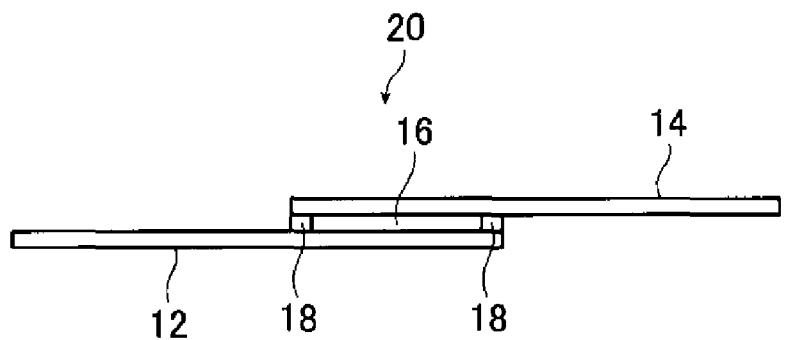
FIG. 3 is a schematic sectional view showing the shear testing piece used to evaluate the shearing adhesive strength and the fracture mode.

FIG. 3 is a schematic sectional view showing the shear testing piece used to evaluate the shearing adhesive strength and the fracture mode in the present invention.

In FIG. 3, the shear testing piece 20 has a spacer 18 (thickness: 0.3 mm; inside cut out to give an application area of 25 mm×10 mm) between a glass 12 (length: 12 cm, width: 2.5 cm, thickness: 4 mm) and a glass 14 (same size as the glass 12), and the inside 16 is filled with the composition 16. The composition 16 becomes the cured material 16 after curing.

FIG. 4 is a schematic top view showing the shear testing piece used to evaluate the shearing adhesive strength and the fracture mode in the present invention.

Figure 4A:
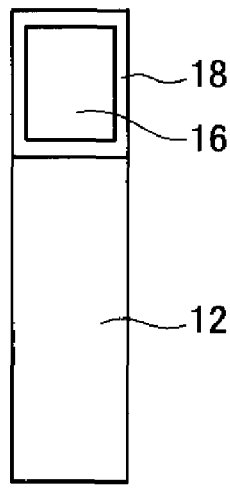
FIG. 4 is a schematic top view showing the shear testing piece used to evaluate the shearing adhesive strength and the fracture mode.
Figure 4B:
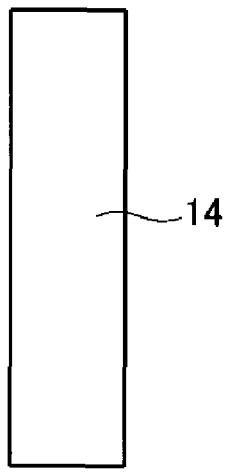
Figure 4C:
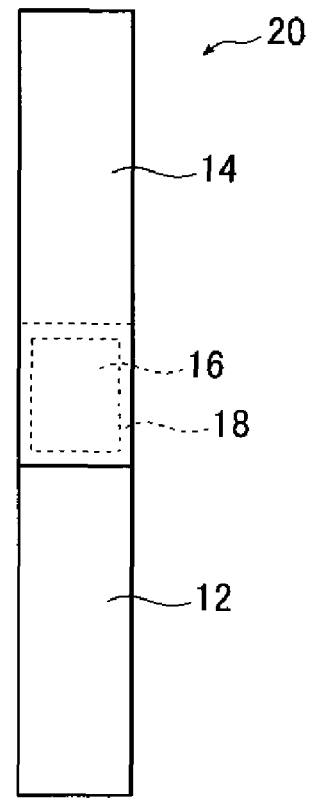

The shear testing piece 20 is obtained by first placing the spacer 18 on the glass 12 as shown in FIG. 4A, pouring the composition 16 into the inside 16 of the frame of the spacer 18, then stacking the glass 14 shown in FIG. 4B on the spacer 18 as shown in FIG. 4C, and heat-curing or photo-curing the shear testing piece 20 shown in FIG. 4C.

Shearing and tensile testing (conditions: 23° C., RH 55%) were performed by using the shear testing piece obtained as described above, and the shearing adhesive strength was measured by using a tension testing machine. The adhesiveness between the glasses was evaluated according to the fracture morphology of the cured material after testing.

In the evaluation criteria for shearing adhesive strength, cases were designated as "○" when the shearing adhesive strength was 1.5 MPa or greater, and "×" when the shearing adhesive strength was less than 1.5 MPa.

Cases were designated as "CF" when the fracture mode was a cohesive fracture, and "AF" when the fracture mode was an interfacial fracture.

As is apparent from the results shown in Table 1, in Comparative Example 1 (curing solely by condensation of silanol groups and alkoxy groups), which did not comprise silicones A through C, a radical initiator, and a bis(alkoxysilyl)alkane, since alcohol occurring as a byproduct of the condensation reaction did not leave the system when curing was performed in a closed system, the product remained uncured. Adhesiveness was low in Comparative Example 2 not including the silicone B and the silicone C, Comparative Example 3 not including the silicone A and the silicone C, Comparative Example 4 not including the silicone A and the silicone B, Comparative Example 5 not including the silicone C, Comparative Example 6 not including the silicone A, and Comparative Example 7 not including the silicone B. Heat-resistant coloration stability was inferior in Comparative Example 8, which included epoxy silicone. Transparency was inferior in Comparative Example 9, which included the polysiloxane A and a filler. Adhesiveness was low in Comparative Example 10, which did not include the polysiloxane C, Comparative Example 11, in which the amount of the polysiloxane C was less than 2 parts by mass, and Comparative Example 12, in which the amount of the polysiloxane B was less than 10 parts by mass. The initial curing state was clouded and transparency was inferior in Comparative Example 13, which did not include the silicone B, and in which the amount of the silicone C was greater than in Comparative Example 7.

In contrast, Examples 1 through 13 had excellent curability and no curing inhibition in a closed system, and excellent adhesiveness to glass, heat-resistant coloration stability over time, and balance between transparency and adhesive strength (shearing strength of 1.5 MPa or greater).

What is claimed is:

1. A curable silicone resin composition comprising:
   100 parts by mass of a silicone A, the weight-average molecular weight of which is 20,000 to 200,000, and which has 2 or more (meth)acryloyl groups per molecule;
   10 parts by mass or more of a silicone B, the weight-average molecular weight of which is 1,000 or greater but less than 20,000, and which has 2 or more (meth)acryloyl groups per molecule;
   2 parts by mass or more of a silicone C, the weight-average molecular weight of which is 300 or more but less than 1,000, the (meth)acrylic equivalent of which is less than 450 g/mol, and which has 2 or more (meth)acryloyl groups per molecule; and
   a radical initiator.

2. The curable silicone resin composition according to claim 1, wherein at least one species selected from the group comprising said silicone A, said silicone B, and said silicone C has one or more silyl groups which include a hydrolyzable group per molecule and/or silanol groups.

3. The curable silicone resin composition according to claim 2, wherein said silicone A is indicated by Formula (A1) below, and said silicone B is indicated by Formula (B1) below:

[Chemical Formula 1]

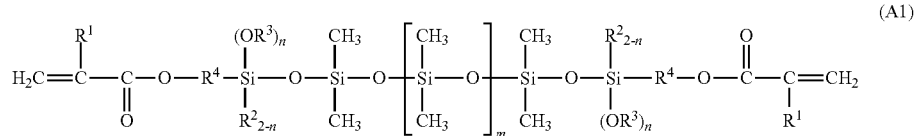

(A1)

In the formula, $R^1$ are each a hydrogen atom or a methyl group; $R^2$ are each a $C_{1-6}$ hydrocarbon group; $R^3$ are each a hydrogen atom or a $C_{1-18}$ hydrocarbon group; $R^4$ are each a $C_{1-8}$ bivalent hydrocarbon group; n are each 1 or 2; and m is an integer from 270 to 2,700;

[Chemical Formula 2]

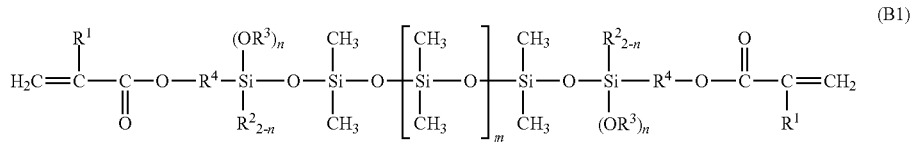

(B1)

In the formula, $R^1$ are each a hydrogen atom or a methyl group; $R^2$ are each a $C_{1-6}$ hydrocarbon group; $R^3$ are each a hydrogen atom or a $C_{1-18}$ hydrocarbon group; $R^4$ are each a $C_{1-8}$ bivalent hydrocarbon group; n are each 1 or 2; and m is an integer from 14 to 269.

4. The curable silicone resin composition according to claim 2, wherein said silicone C is at least one species selected from the group comprising compounds indicated by Formula (3) below, Formula (4) below, and Formula (5) below:

[Chemical Formula 3]

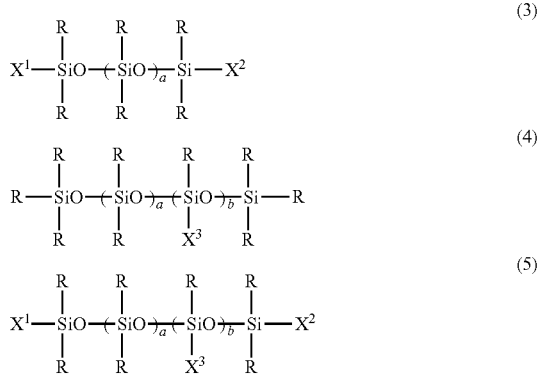

In Formula (3), R are each an alkyl group; $X^1$ and $X^2$ are each a group indicated by Formula (6) below; and a is an integer from 0 to 13;

In Formula (4), R are each an alkyl group; $X^3$ is a group indicated by Formula (6) below; a is an integer from 0 to 13; b is 1 or an integer from 2 to 13; a+b is 1 or 2 to 13; and at least one R at one end may be designated as $X^3$, where $X^3$ is a group indicated by Formula (6) below;

In Formula (5), R are each an alkyl group; $X^1$, $X^2$, and $X^3$ are each a group indicated by Formula (6) below; a is an integer from 0 to 13; b is an integer from 1 to 13; and a+b is 1 to 13;

[Chemical Formula 4]

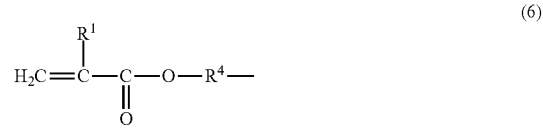

(6)

In Formula (6), $R^1$ is a hydrogen group or a methyl group; and $R^4$ is a bivalent hydrocarbon group.

5. The curable silicone resin composition according to claim 2, further comprising a condensation catalyst.

6. The curable silicone resin composition according to claim 2, further comprising a bis(alkoxysilyl)alkane.

7. The curable silicone resin composition according to claim 1, wherein said silicone A is indicated by Formula (A1) below, and said silicone B is indicated by Formula (B1) below:

[Chemical Formula 1]

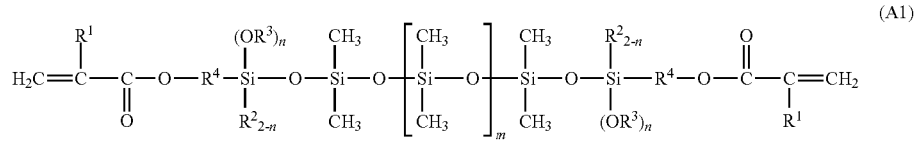

(A1)

In the formula, $R^1$ are each a hydrogen atom or a methyl group; $R^2$ are each a $C_{1-6}$ hydrocarbon group; $R^3$ are each a hydrogen atom or a $C_{1-18}$ hydrocarbon group; $R^4$ are each a $C_{1-8}$ bivalent hydrocarbon group; n are each 1 or 2; and m is an integer from 270 to 2,700;

[Chemical Formula 2]

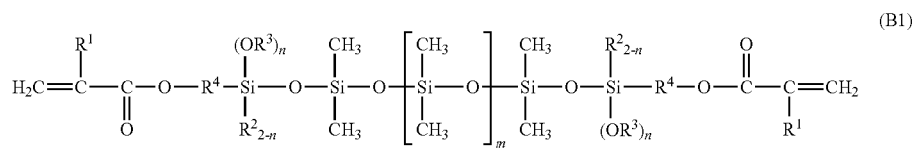

(B1)

In the formula, $R^1$ are each a hydrogen atom or a methyl group; $R^2$ are each a $C_{1-6}$ hydrocarbon group; $R^3$ are each a hydrogen atom or a $C_{1-18}$ hydrocarbon group; $R^4$ are each a $C_{1-18}$ bivalent hydrocarbon group; n are each 1 or 2; and m is an integer from 14 to 269.

8. The curable silicone resin composition according to claim 7, wherein said silicone C is at least one species selected from the group comprising compounds indicated by Formula (3) below, Formula (4) below, and Formula (5) below:

[Chemical Formula 3]

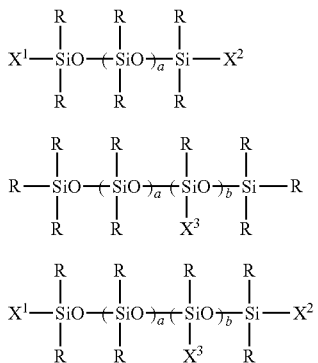

In Formula (3), R are each an alkyl group; $X^1$ and $X^2$ are each a group indicated by Formula (6) below; and a is an integer from 0 to 13;
In Formula (4), R are each an alkyl group; $X^3$ is a group indicated by Formula (6) below; a is an integer from 0 to 13; b is 1 or an integer from 2 to 13; a+b is 1 or 2 to 13; and at least one R at one end may be designated as $X^3$, where $X^3$ is a group indicated by Formula (6) below;
In Formula (5), R are each an alkyl group; $X^1$, $X^2$, and $X^3$ are each a group indicated by Formula (6) below; a is an integer from 0 to 13; b is an integer from 1 to 13; and a+b is 1 to 13;

[Chemical Formula 4]

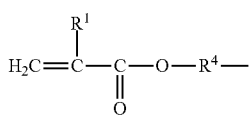

In Formula (6), $R^1$ is a hydrogen group or a methyl group; and $R^4$ is a bivalent hydrocarbon group.

9. The curable silicone resin composition according to claim 7, further comprising a condensation catalyst.

10. The curable silicone resin composition according to claim 7, further comprising a bis(alkoxysilyl)alkane.

11. The curable silicone resin composition according to claim 1, wherein said silicone C is at least one species selected from the group comprising compounds indicated by Formula (3) below, Formula (4) below, and Formula (5) below:

[Chemical Formula 3]

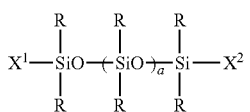

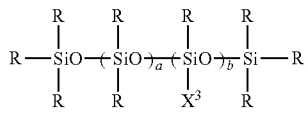

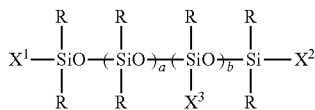

Formula (3), R are each an alkyl group; $X^1$ and $X^2$ are each a group indicated by Formula (6) below; and a is an integer from 0 to 13;
In Formula (4), R are each an alkyl group; $X^3$ is a group indicated by Formula (6) below; a is an integer from 0 to 13; b is 1 or an integer from 2 to 13; a+b is 1 or 2 to 13; and
at least one R at one end may be designated as $X^3$, where $X^3$ is a group indicated by Formula (6) below;
In Formula (5), R are each an alkyl group; $X^1$, $X^2$, and $X^3$ are each a group indicated by Formula (6) below; a is an integer from 0 to 13; b is an integer from 1 to 13; and a+b is 1 to 13;

[Chemical Formula 4]

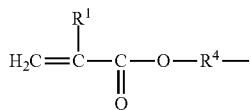

In Formula (6), $R^1$ is a hydrogen group or a methyl group; and $R^4$ is a bivalent hydrocarbon group.

12. The curable silicone resin composition according to claim 11, further comprising a condensation catalyst.

13. The curable silicone resin composition according to claim 11, further comprising a bis(alkoxysilyl)alkane.

14. The curable silicone resin composition according to claim 1, further comprising a condensation catalyst.

15. The curable silicone resin composition according to claim 14, wherein the amount of said condensation catalyst is 0.01 to 10 parts by mass with respect to a total of 100 parts by mass of said silicone A, said silicone B, and said silicone C.

16. The curable silicone resin composition according to claim 15, further comprising a bis(alkoxysilyl)alkane.

17. The curable silicone resin composition according to claim 14, further comprising a bis(alkoxysilyl)alkane.

18. The curable silicone resin composition according to claim 1, further comprising a bis(alkoxysilyl)alkane.

19. The curable silicone resin composition according to claim 18, wherein said bis(alkoxysilyl)alkane is at least one species selected from the group comprising bis-(3-trimethoxysilylpropyl)amine, 1,2-bis(triethoxysilyl)ethane, 1,6-bis(trimethoxysilyl)hexane, 1,7-bis(trimethoxysilyl)heptane, 1,8-bis(trimethoxysilyl)octane, 1,9-bis(trimethoxysilyl)nonane, and 1,10-bis(trimethoxysilyl)decane.

20. The curable silicone resin composition according to claim 18, wherein the amount of said bis(alkoxysilyl)alkane is 0.01 to 10 parts by mass with respect to 100 parts by mass of said silicone A.

* * * * *